Jan. 25, 1949.  O. C. PALMER  2,460,237
TROLLING PLATE
Filed Aug. 15, 1947
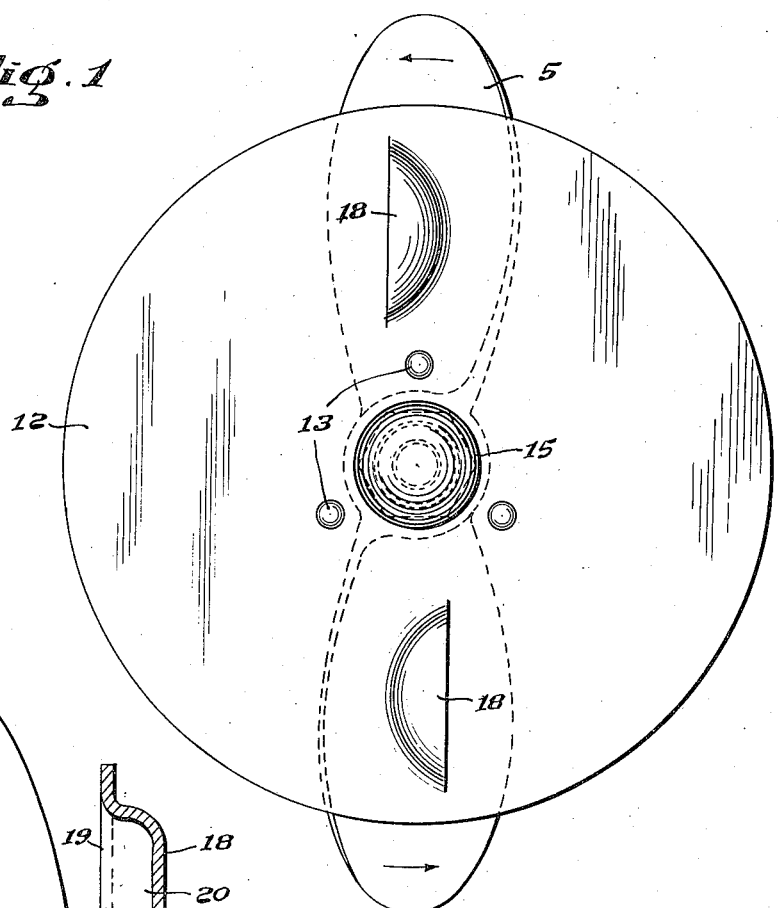
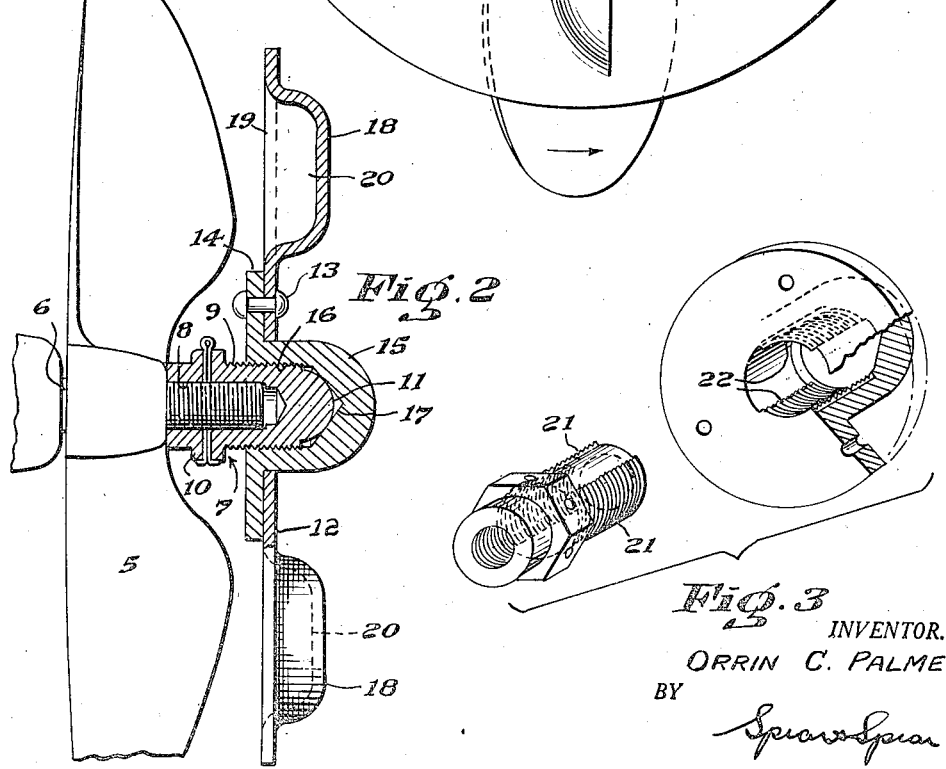
INVENTOR.
ORRIN C. PALMER
BY
ATTORNEYS Patented Jan. 25, 1949

2,460,237

UNITED STATES PATENT OFFICE 2,460,237

TROLLING PLATE

Orrin C. Palmer, Melrose, Mass.

Application August 15, 1947, Serial No. 768,843

6 Claims. (Cl. 170—135)

This invention relates to improvements in trolling plates for use with boat propellers to enable boats to be propelled at slow or trolling speeds without so reducing their engine speeds as to interfere with proper functioning of their engines.

Outstanding objections to trolling plates as heretofore provided are that they either are not capable of being applied to and removed from propellers or propeller shafts with desired facility, or else they are unbalanced if they are designed for ready application to and removal from propellers or propeller shafts.

Accordingly, the object of the present invention is to provide a balanced trolling plate and simple, practical means whereby the same may readily and easily be applied to and removed from a propeller shaft.

With the foregoing and other objects in view, which will become more fully apparent as the nature of the invention is better understood, the same consists in a trolling plate and mounting means therefor embodying the novel features of construction, combination and arrangement of parts as are illustrated by way of example in the accompanying drawings and as will be hereinafter more fully described and claimed.

In the drawings:

Fig. 1 is a rear view of my trolling attachment showing its relation to the propeller.

Fig. 2 is a vertical section through the attachment shown in Fig. 1, and

Fig. 3 is a view in perspective and partly sectioned of a modified form of hub and adaptor.

At 5, I have indicated a propeller mounted on the drive shaft 6 to rotate therewith and held thereon by the adaptor 7 which replaces the usual propeller retaining cap nut. The adaptor 7 is threaded on a rearward extension 8 of the shaft 6 and is exteriorly threaded as at 9 between its nut establishing flange 10 and its rounded rear end 11. Transverse bores through the nut flange 10 enable the adaptor 7 to be locked to the shaft 6 by means of a cotter pin.

The plate 12, the diameter of which is less than that of the propeller 5, is riveted, or otherwise rigidly secured, as at 13 to the flange 14 of the hub 15. The hub 15 has a threaded bore 16 which at its inner end 17 is tapered. The hub 15 is threaded on the adaptor 7 whenever the trolling plate is to be used and both the threaded connection between the adaptor 7 and the shaft 6 and the threaded connection between the hub 15 and the adaptor 7 are pitched so that the adaptor 7 and hub 15 are applied to the shaft extension 8 and said adapter, respectively, by rotation in a direction opposite to the direction of rotation of the propeller 5. When the hub 15 is threaded on the adaptor 7 with the tapered end 17 of the bore 16 in contact with the rounded end 11 of said adaptor, a tight connection is established between said adapter and said hub. In this connection the hub 15 may, if desired, be formed to be screwed directly upon the shaft extension 8 so as to accomplish the propeller securing function of the adapter 7, in which event any necessity of employing said adapter is avoided. If, however, the adapter 7 is employed to fasten the propeller 5 on the shaft 6 and if the plate 12 is mounted on said adapter, the latter will constitute to all intents and purposes a part of the shaft extension 8. Therefore, in the claims the expression "rearward extension of a propeller shaft" is to be construed as meaning either an integral part of the propeller shaft or an element such as the adapter 7 separate from said shaft and mounted thereon.

In accordance with my invention, I provide the plate 12 with equally spaced members 18 protruding rearwardly from its rear surface so that when the hub 15 is threaded on the adaptor 7 and the trolling plate is used, rotation of said plate with the propeller is resisted and thereby a substantial torque is maintained on the threaded connections to maintain the latter tight. Preferably, the members 18 are of scoop-like or louver form and have their mouths 20 disposed forwardly as regards the direction of the propeller's rotation so that an adequate torque on the threaded connections is ensured to maintain them tight. Preferably, too, the plate 12 is provided, in underlying relationship to the members 18, with openings 19 through which water scooped by said members may flow. As shown, said plate may conveniently be provided with said members 18 and said openings 19 by pressing said members from said plate.

In Fig. 3, I have shown a modification of the threaded connection between the hub 15 and the adaptor 7. The adaptor 7 has a set of spaced ridges 21 in parallel with its axis and the bore of the hub 15 has a like set of ridges 22. The ridges 22 are spaced and dimensioned so that each may enter between a pair of the ridges 21. The ridges 21 and 22 are complementally threaded so that the hub 15 may be slipped onto the adaptor 7 substantially into its seated position and then be fully seated by a partial rotation of the hub 15. This ensures maximum ease and convenience in attaching and removing my trolling plate to and from the adaptor nut 7.

My trolling plate not only is balanced but is designed for economical production and obviously may be applied to and removed from a rearward extension of a propeller shaft with facility.

What I therefore claim and desire to secure by Letters Patent is:

1. A trolling plate to be threaded upon a rearward extension of a propeller shaft in a direction opposite to the direction of rotation of the propeller, and scoop-like elements carried by said plate and projecting laterally therefrom to resist rotation of said plate so that in use said plate tends to become more tightly threaded upon said propeller shaft extension.

2. A trolling plate to be threaded upon a rearward extension of a propeller shaft in a direction opposite to the direction of rotation of the propeller, and scoop-like elements carried by said plate and projecting laterally therefrom to resist rotation of said plate so that in use said plate tends to become more tightly threaded upon said propeller shaft extension, said plate having openings therein through which water scooped by said scoop-like elements may flow.

3. A trolling plate attachment comprising, in combination, an exteriorly threaded element to be secured upon a propeller shaft to fasten a propeller on said shaft, a trolling plate to be threaded upon said element in a direction opposite to the direction of rotation of the propeller, and scoop-like elements carried by said trolling plate and projecting laterally therefrom to resist rotation of said plate so that in use said plate tends to become more tightly threaded upon said element.

4. A trolling plate attachment comprising, in combination, an exteriorly threaded element to be secured upon a propeller shaft to fasten a propeller on said shaft, a trolling plate to be threaded upon said element in a direction opposite to the direction of rotation of the propeller, and scoop-like elements carried by said plate and projecting laterally therefrom to resist rotation of said plate so that in use said plate tends to become more tightly threaded upon said element, said plate having openings therein through which water scooped by said scoop-like elements may flow.

5. In combination, a propeller shaft, a propeller mounted thereon, a trolling plate threaded upon a rearward extension of said shaft in a direction opposite to the direction of rotation of the propeller, and scoop-like elements carried by said plate and projecting laterally therefrom to resist rotation of said plate so that in use said plate tends to become more tightly threaded upon said shaft extension.

6. In combination, a propeller shaft, a propeller mounted thereon, a trolling plate threaded upon a rearward extension of said shaft in a direction opposite to the direction of rotation of the propeller, and scoop-like elements carried by said plate and projecting laterally therefrom to resist rotation of said plate so that in use said plate tends to become more tightly threaded upon said shaft extension, said plate having openings therein through which water scooped by said scoop-like elements may flow.

ORRIN C. PALMER.

REFERENCES CITED

The following references are of record in the file of this patent:

UNITED STATES PATENTS

| Number | Name | Date |
|---|---|---|
| 1,908,865 | Richardson | May 16, 1933 |
| 2,226,007 | McGrete | Dec. 24, 1940 |
| 2,265,625 | Buck | Dec. 9, 1941 |